(12) United States Patent
Chiu et al.

(10) Patent No.: US 12,416,758 B2
(45) Date of Patent: Sep. 16, 2025

(54) BACKLIGHT MODULE INCLUDING LIGHT GUIDE STRUCTURE

(71) Applicant: DARWIN PRECISIONS CORPORATION, Hsinchu County (TW)

(72) Inventors: Yu-Huan Chiu, Hsinchu County (TW); Hsiang-I Hu, Hsinchu County (TW); Jian-Jhih You, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 18/636,309

(22) Filed: Apr. 16, 2024

(65) Prior Publication Data
US 2025/0044493 A1    Feb. 6, 2025

(30) Foreign Application Priority Data
Aug. 2, 2023    (TW) .................................. 112129111

(51) Int. Cl.
| | |
|---|---|
| *F21V 8/00* | (2006.01) |
| *G02F 1/13* | (2006.01) |
| *G02F 1/1335* | (2006.01) |
| *G02F 1/13357* | (2006.01) |

(52) U.S. Cl.
CPC ......... *G02B 6/0091* (2013.01); *G02B 6/0035* (2013.01); *G02B 6/0036* (2013.01); *G02B 6/0066* (2013.01); *G02B 6/0068* (2013.01); *G02B 6/0076* (2013.01);
(Continued)

(58) Field of Classification Search
CPC .. G02B 6/0036; G02B 6/0038; G02B 6/0043; G02B 6/0066; G02B 6/0076; G02B 6/0091
See application file for complete search history.

(56) References Cited

U.S. PATENT DOCUMENTS

| | | | |
|---|---|---|---|
| 4,860,171 A * | 8/1989 | Kojima ................ | G02B 6/0041 |
| | | | 362/616 |
| 10,935,715 B2 * | 3/2021 | Park ....................... | G02B 6/005 |
| (Continued) | | | |

FOREIGN PATENT DOCUMENTS

| | | |
|---|---|---|
| CN | 113204070 A | 8/2021 |
| CN | 115981052 A | 4/2023 |
| (Continued) | | |

*Primary Examiner* — Keith G. Delahoussaye

(57) ABSTRACT

A backlight module includes stacked light guide plates, a light source module, and a deflecting film. Each light guide plate has a light-incident surface, a light exit surface, a bottom surface, and a light guide structure. The light exit surface and the bottom surface are placed on two opposite sides of the light guide plate and both connected to the light-incident surface, and the light guide structure is formed on the bottom surface. The light-incident surfaces are placed on a light entry side and arranged along a stacking direction. The light source module is disposed on the light entry side and includes light-emitting elements. The light-emitting elements are arranged in a single line along the light-incident surface of each light guide plate, and each light-emitting element has a light emitting surface facing the light-incident surfaces of the plurality of light guide plates.

9 Claims, 8 Drawing Sheets

(52) U.S. Cl.
CPC ...... *G02F 1/1323* (2013.01); *G02F 1/133524* (2013.01); *G02F 1/133607* (2021.01); *G02F 1/133615* (2013.01)

(56) References Cited

U.S. PATENT DOCUMENTS

| | | | |
|---|---|---|---|
| 2003/0184990 A1* | 10/2003 | Lin | B60K 35/22 |
| | | | 362/616 |
| 2005/0237768 A1* | 10/2005 | Matsumoto | G02B 6/0036 |
| | | | 362/620 |
| 2009/0185389 A1* | 7/2009 | Tessnow | G02B 6/0038 |
| | | | 362/516 |
| 2021/0239896 A1 | 8/2021 | Tang et al. | |
| 2023/0101373 A1* | 3/2023 | Kim | G02B 6/0036 |
| | | | 362/613 |
| 2023/0273362 A1* | 8/2023 | Yagi | G02B 6/0075 |
| | | | 362/606 |
| 2023/0288753 A1* | 9/2023 | Shiau | G02F 1/133615 |
| 2023/0417978 A1* | 12/2023 | Kanbayashi | G02B 6/0088 |

FOREIGN PATENT DOCUMENTS

| | | |
|---|---|---|
| TW | I592722 B | 7/2017 |
| TW | I764775 B | 5/2022 |
| TW | 202238230 A | 10/2022 |

\* cited by examiner

BACKLIGHT MODULE INCLUDING LIGHT GUIDE STRUCTURE

FIELD OF THE INVENTION

The present invention relates to a backlight module, and in particular to an anti-peeping backlight module.

BACKGROUND OF THE INVENTION

To meet user privacy and other requirements, conventional backlight modules employ an architecture including a diffusion sheet, a prism sheet, and an anti-peeping sheet, to achieve the effect of viewing angle convergence and anti-peeping. However, this architecture is often faced with problems of low efficiency, insufficient brightness, and excessive power generation, which are caused by a much too big light exit angle of a lower light guide plate, low light utilization due to dispersed energy, and a decrease in brightness after penetration through the anti-peeping sheet by light, and other factors. In addition, this architecture thickens backlight modules and increases costs. To solve problems such as low efficiency and insufficient brightness, light guide plates with a V-cut are being tried out. However, when such light guide plates are applied in automotive displays, industrial control, and other display fields, a projected water ripple phenomenon tends to occur on the light entry side, which affects the visual experience.

SUMMARY OF THE INVENTION

The present invention provides a backlight module. The backlight module has a simplified structure, is capable of reducing costs, and can solve problems such as low light utilization, insufficient brightness, excessive power, etc. In addition, the backlight module has high brightness, can achieve effects of viewing angle convergence and anti-peeping, and can help to eliminate the projected water ripple phenomenon.

The backlight module provided by the present invention includes a plurality of light guide plates, a light source module, and a deflecting film. The plurality of light guide plates are stacked, and each light guide plate includes a light-incident surface, a light exit surface, a bottom surface, and a light guide structure. The light exit surface and the bottom surface are placed on two opposite sides of the light guide plate and both are connected to the light-incident surface, and the light guide structure is formed on the bottom surface. The light-incident surfaces of the plurality of light guide plates are placed on a light entry side and arranged along a stacking direction. The light source module is disposed on the light entry side and includes a plurality of light-emitting elements. The plurality of light-emitting elements are arranged in a single line along the light-incident surface of each light guide plate, and each light-emitting element has a light emitting surface facing the light-incident surfaces of the plurality of light guide plates. The deflecting film is disposed on the plurality of light guide plates.

The present invention employs a plurality of light guide plates, and each light guide plate has a light guide structure. Therefore, the present invention can avoid projected water ripples and can allow a rather small angle range for lights to exit, thereby realizing high light directionality and high light utilization, achieving effects of viewing angle convergence and anti-peeping while maintaining brightness.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

The foregoing and other technical contents and other features and advantages of the present invention will be clearly presented from the following detailed description of a preferred embodiment in cooperation with the accompanying drawings. Directional terms mentioned in the following examples, for example, upper, lower, left, right, front, back, top or bottom, are only used to describe directions referring to the attached drawings. Therefore, the directional terms used are for illustration and not for limitation. In addition, terms such as "first" and "second" involved in the description or claims are merely used for naming the elements or distinguishing different embodiments or ranges rather than limiting the upper limit or lower limit of the quantity of the elements.

Figure 1:
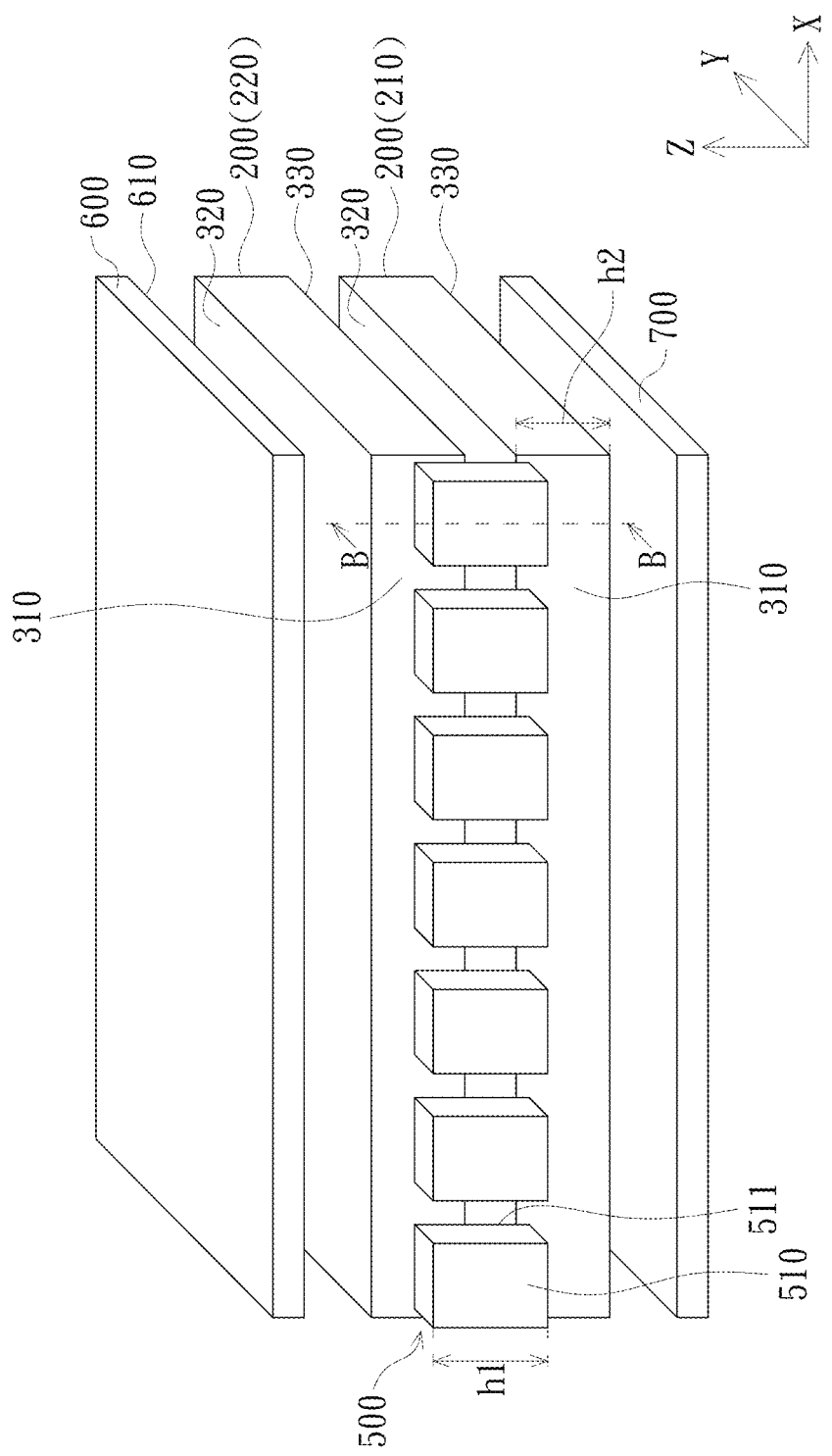
FIG. 1 is a schematic three-dimensional diagram of a backlight module according to an embodiment of the present invention.

FIG. 1 is a schematic three-dimensional diagram of a backlight module according to an embodiment of the present invention. As shown in FIG. 1, in this embodiment of the present invention, the backlight module 10 includes a plurality of light guide plates 200, a light source module 500, and a deflecting film 600. The plurality of light guide plates 200 are stacked and each light guide plate 200 has a light-incident surface 310, a light exit surface 320, a bottom surface 330, and a light guide structure 400 (will be described in the following). The light exit surface 320 and the bottom surface 330 are placed on two opposite sides of the light guide plate 200 and both connected to the light-incident surface 310. The light guide structure 400 is formed on the bottom surface 330. The light guide structure 400 may be in any shape, for example, a V-cut, and allow the lights traveling in the light guide plate 200 to exit from the light exit surface 320. In this embodiment of the present invention, the light guide structure 400 is further used to render the reflected lights more directional.

Further, the plurality of light guide plates 200 are arranged along a stacking direction Z. The bottom surface 330 of the upper light guide plate 200 faces the light exit surface 320 of the lower light guide plate 200, and the light-incident surfaces 310 are both placed on a light entry side S. Preferably, the plurality of light-incident surfaces 310 are substantially arranged along the stacking direction Z and aligned. The light source module 500 is disposed on the light entry side S and includes a plurality of light-emitting elements 510. Each light-emitting element 510 has a light emitting surface 511 facing the light-incident surfaces 310 of the plurality of light guide plates 200, and is suitable for emitting light to the plurality of light guide plates 200 through the plurality of light-incident surfaces 310.

In this embodiment of the present invention, the plurality of light-emitting elements 510 are arranged in a line. In a preferred embodiment, the plurality of light-emitting elements 510 are arranged in a single line along the light-incident surface 310 of the light guide plate 200 in a direction X. The light-emitting element 510 has a height h1 in the stacking direction Z, and the height h1 is preferably greater than a height h2 of a single light guide plate 200 in the stacking direction Z. In other words, the light-emitting element 510 in this embodiment of the present invention may have a large dimension, and the height h1 is greater than that of the light guide plate 200. In a preferred embodiment of the present invention, the light-emitting element 510 has a long service life, and is therefore suitable for an apparatus with a specific backlight requirement. In various embodiments of the present invention, the backlight module 10 may be used in automotive displays, industrial control, and other display fields. The light-emitting elements 510 can have a large dimension and a long service life, and can thus provide backlight for tens of thousands of hours.

Figure 2:
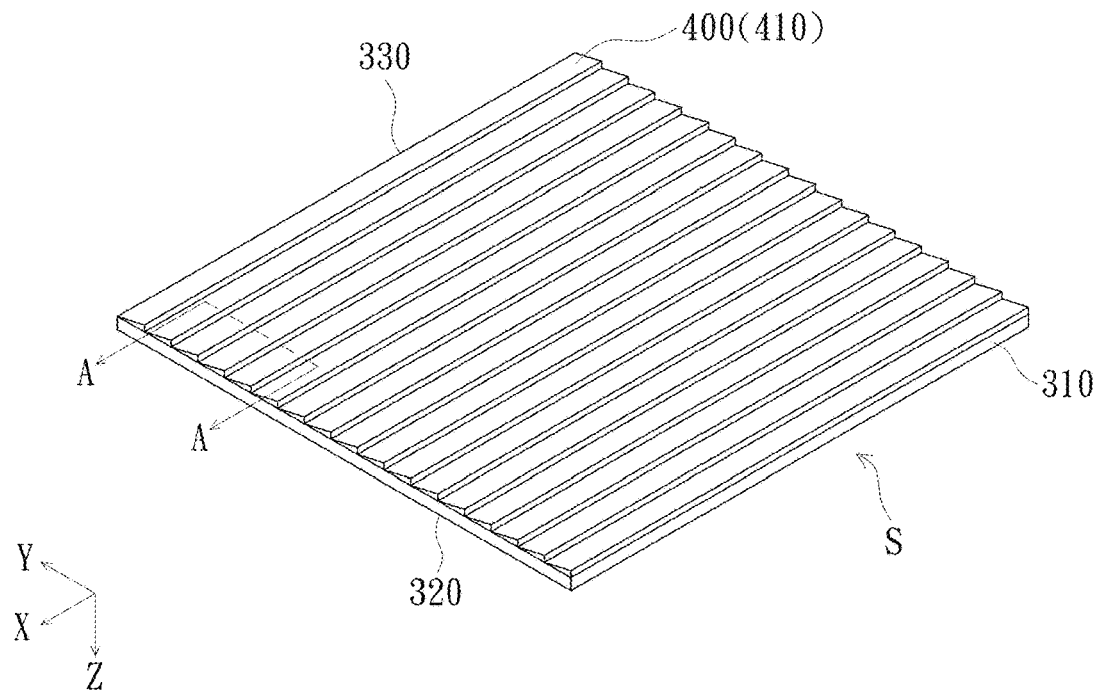
FIG. 2 is a schematic three-dimensional diagram of a light guide plate according to a first embodiment of the present invention.
Figure 3:
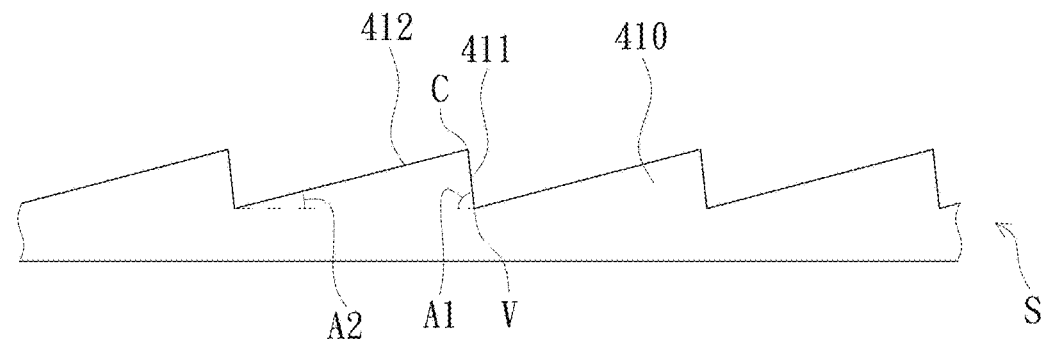
FIG. 3 is a partial sectional view of a light guide plate according to the first embodiment of the present invention.

FIG. 2 is a schematic three-dimensional diagram of a light guide plate according to an embodiment of the present invention, and FIG. 3 is a schematic sectional view along a section line A-A in FIG. 2. As shown in FIG. 2, the light guide structure 400 includes a plurality of prisms 410 arranged along a direction Y away from the light entry side S. The prism 410 can control the light exit angle at which the light exits from the light exit surface 320. As shown in FIG. 3, each prism 410 has a first surface 411 and a second surface 412. The first surface 411 faces the light entry side S, the second surface 412 faces away from the light entry side S, and the first surface 411 and the second surface 412 border each other along an edge line C of the prism 410. Sections of the prisms 410 shown by FIGS. 2 and 3 are roughly triangular and spaced apart from each other at fixed intervals, but the present invention is not limited thereto. In addition, the first surface 411 and the second surface 412 may further border each other on a curved surface. In other words, the prism 410 has an edge portion (not shown), and the edge portion may have no obvious edge line C. The section of the edge portion may be, for example, a fillet with a radius of R. In a preferred embodiment of the present invention, the plurality of prisms 410 can allow a rather small angle range for lights to exit.

The first surface 411 has a first angle A1 with respect to the bottom surface 330, and the second surface 412 has a second angle A2 with respect to the bottom surface 330. The first angle A1 may not be equal to the second angle A2. In various embodiments of the present invention, the first angle A1 is greater than the second angle A2, and the second angle A2 is preferably smaller than 15 degrees, more preferably smaller than 3 degrees, so as to allow a specific angle for lights to exit. For example, the light exit angle (which is an angle with respect to a normal of the light exit surface 320) may be 70 to 80 degrees. In addition, in this embodiment of the present invention, if the second angle A2 is smaller than three degrees, lights can be further allowed a smaller angle range to exit and thus become more directional.

Figure 4:
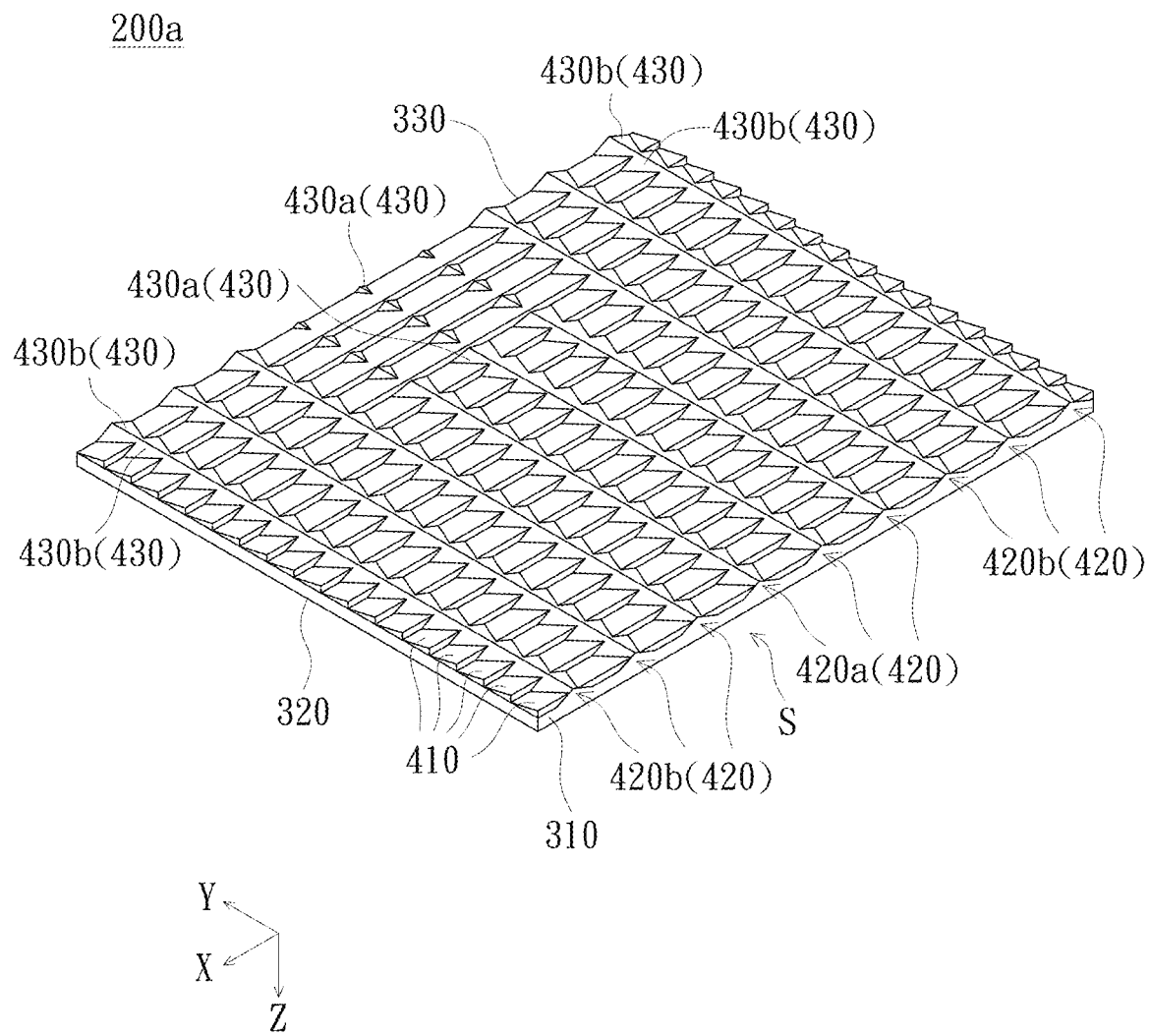
FIG. 4 is a schematic three-dimensional diagram of a light guide plate according to a second embodiment of the present invention.

FIG. 4 is a schematic three-dimensional diagram of a light guide plate according to another embodiment of the present invention. As shown in FIG. 4, the light guide structure 400 may further include a plurality of microstructure groups 420, each including a plurality of microstructures 430 and arranged between two adjacent prisms 410. The microstructure 430 can improve the uniformity of surface light sources, thereby avoiding bright or dark ripples. The plurality of microstructures 430 in each microstructure group 420 may be partially or completely connected or not connected to each other. Additionally, the plurality of microstructures 430 in each microstructure group 420 may be arranged along a preset path. For example, as shown by FIG. 4, the plurality of microstructure groups 420 further include first microstructure groups 420a and second microstructure groups 420b. The plurality of first microstructures 430a of the first microstructure groups 420a are arranged along a linear path and partially connected, and the plurality of second microstructures 430b of the second microstructure groups 420b are completely connected. In another embodiment, the plurality of microstructures 430 may alternatively be arranged along, for example, a zigzag path, thereby forming a staggered pattern.

Figure 5:
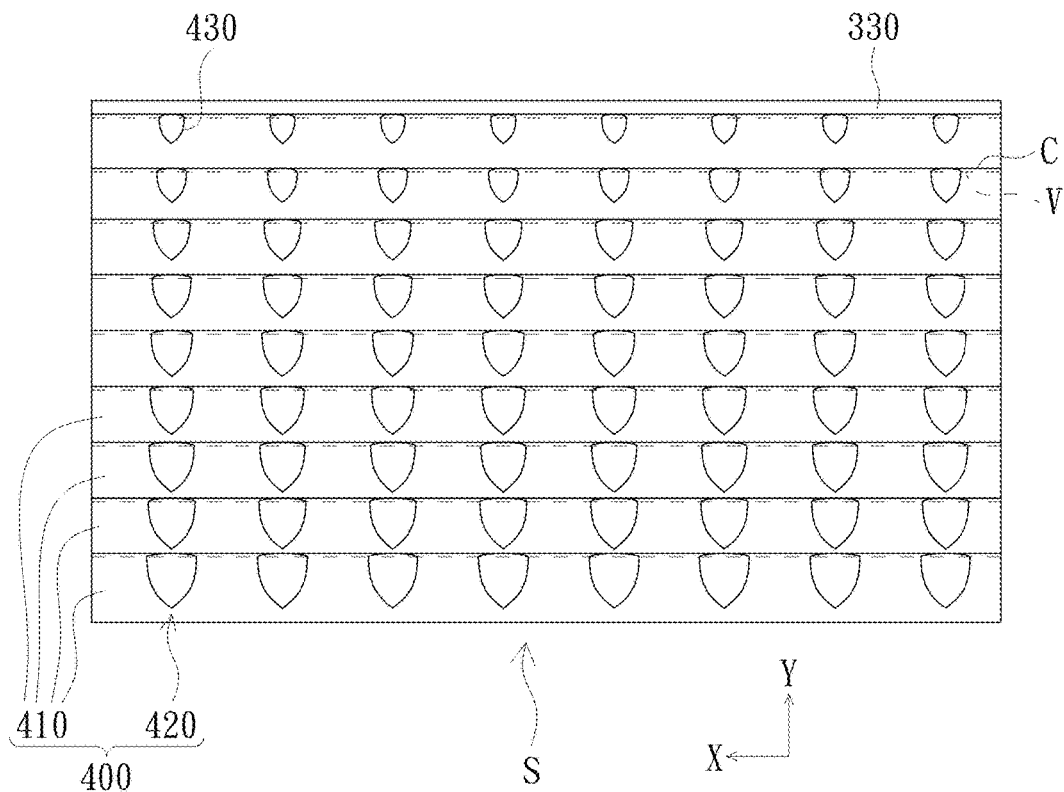
FIG. 5 is a schematic bottom view of a light guide plate according to a third embodiment of the present invention.

The microstructure 430 shown in FIG. 4 is a raised bulge block, but the microstructure 430 may be a concaved groove in another embodiment. The microstructure 430 may be pyramid-shaped. For example, some of the microstructures 430a in FIG. 4 are pyramid-shaped with a planar side surface. However, the microstructure 430 may have a curved surface in another embodiment. FIG. 5 is a schematic bottom view of a light guide plate according to another embodiment of the present invention. As shown in FIG. 5, the light guide structure 400 of the light guide plate 200b includes a plurality of prisms 410 and a plurality of microstructure groups 420. On the bottom surface 330, a solid line is used to represent the edge line C of the prism 410, and a dotted line is used to represent a valley line V of the prism 410. The light guide plate in this embodiment and the foregoing light guide plate 200a differ in that the surface of the microstructure 430 is a curved surface, and the shape of the section thereof may have a curved line.

Figure 6:
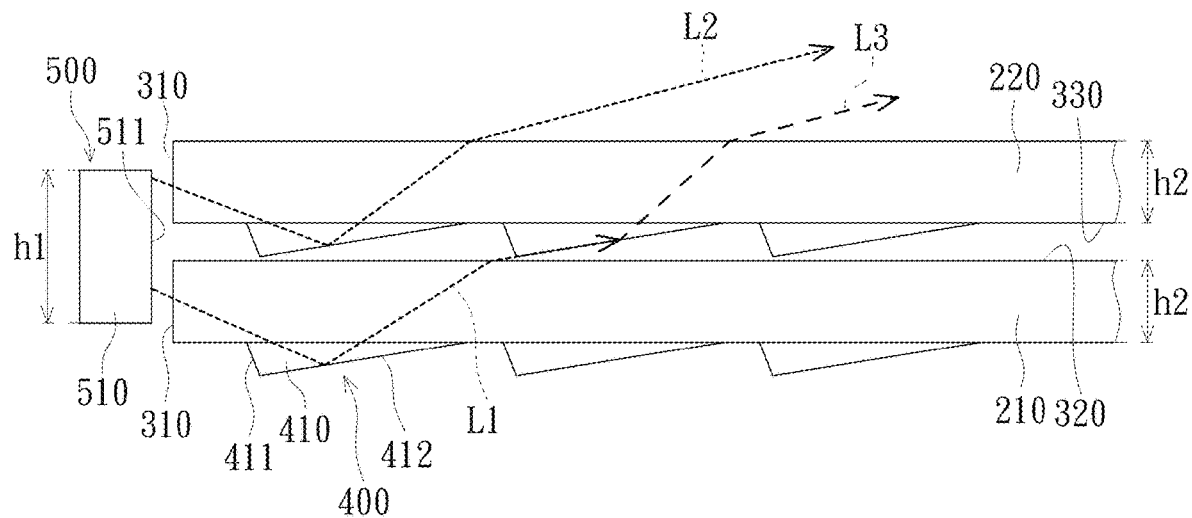
FIG. 6 is a schematic sectional view of the embodiment in FIG. 1.

In various embodiments of the present invention, the number of light guide plates 200 may be two, which include, for example, a first light guide plate 210 and a second light guide plate 220. FIG. 6 is a schematic sectional view along a section line B-B in FIG. 1. As shown in FIG. 6, the first light guide plate 210 and the second light guide plate 220 are stacked, the second light guide plate 220 is placed on a light exit surface 320 side of the first light guide plate 210, and the light emitting surface 511 of the light-emitting element 510 of the light source module 500 faces the light-incident surfaces 310 of the first light guide plate 210 and the second light guide plate 220. As described above, the first light guide plate 210 and the second light guide plate 220 both have a height of h2. In this embodiment of the present invention, h2 is smaller than h1, and a sum of the heights of the plurality of light guide plates 200 (e.g. a sum of the heights of the first light guide plate 210 and the second light guide plate 220, h2+h2) is preferably greater than the height h1. The fact that h2+h2≥h1 helps ensure that the light emitting surface 511 can face the light-incident surfaces 310 of the plurality of light guide plates 200 to the maximum extent, such that the light source can effectively enter the light guide plates 200 so as to generate a surface light source. The number of light guide plates 200 may alternatively be more than two, for example, three, four, or five, and preferably no more than five. Regardless of the number, the sum of the heights of the plurality of light guide plates 200 is preferably greater than the height h1, and the light emitting surface 511 of the light-emitting element 510 preferably faces the light-incident surfaces 310 of the plurality of light guide plates 200.

In various embodiments of the present invention, the first light guide plate 210 and the second light guide plate 220 are the same and have the same light guide structure 400. As shown in FIGS. 2 and 6, because the first light guide plate 210 and the second light guide plate 220 each have a plurality of prisms 410, lights can always exit from each light guide plate 200 within a specific angle range regardless of whether the light source enters the first light guide plate 210 or the second light guide plate 220. That is, the light path L1 and the light path L2 are substantially within the same angle range. Since the prism 410 has a second angle A2 that is small and nearly horizontal, the amount of deflection can still be limited to a small angle as lights exiting from the first light guide plate 210 enter the second light guide plate 220 after passing through the light guide structure 400 from the bottom surface 330 side of the second light guide plate 220, even in the case where lights are deflected in a manner shown by a light path L3. In various embodiments of the present invention, the amount of deflection may be smaller than three degrees.

In other embodiments of the present invention, the plurality of light guide plates 200 may also be different, for example, having different microstructure groups 420. However, although the plurality of light guide plates 200 may be different from each other, they are all highly directional, and the sum of the heights of the plurality of light guide plates 200 is greater than or equal to the height h1. Even if the plurality of light guide plates 200 are different from each other, the different light guide plates 200 can still preferably allow the same specific angle within the same small angle range for lights to exit, and the amount of deflection of exiting lights, which is caused by the stacking of a plurality of light guide plates 200, can be limited to a small angle.

Figure 7:
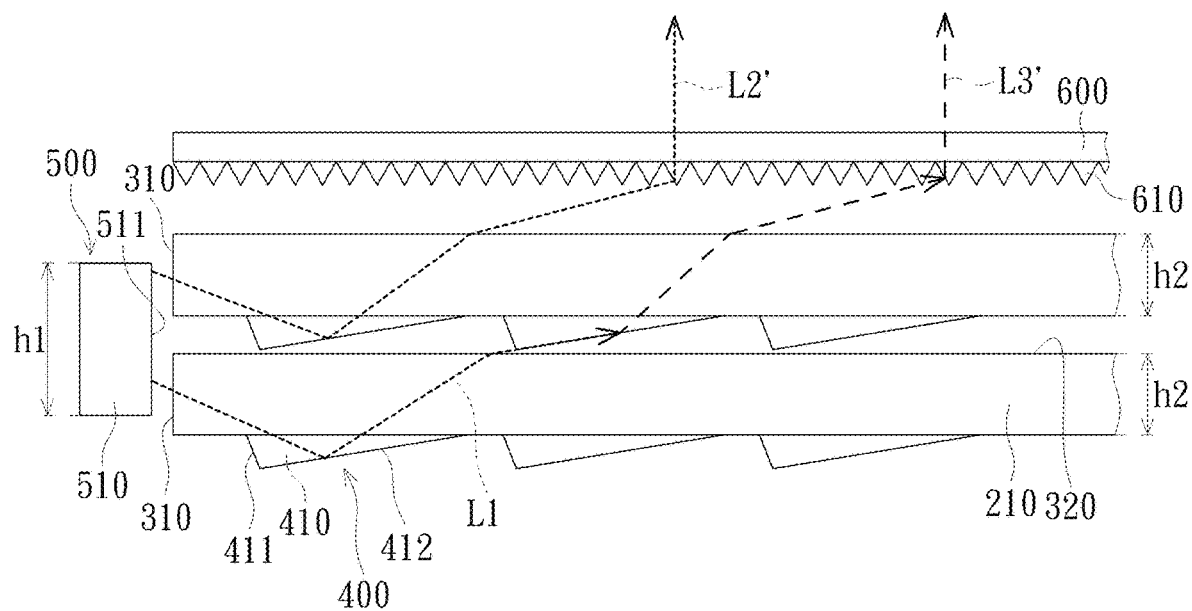
FIG. 7 is another schematic sectional view of the embodiment in FIG. 1.

As shown in FIGS. 1 and 7, the deflecting film 600 of the backlight module 10 is disposed on the plurality of light guide plates 200. The deflecting film 600 has a prism surface 610, and the prism surface 610 faces the light exit surface 320 of the light guide plate 200, for example, the light exit surface 320 of the second light guide plate 220. In a preferred embodiment of the present invention, as shown by light paths L2' and L3', the deflecting film 600 can guide the light exiting from the plurality of light guide plates 200 towards a normal direction or a nearby range thereof. Because the plurality of light guide plates 200 can allow a small angle range for lights to exit, and the amount of deflection of the exiting lights is small, the deflecting film 600 can effectively guide the exiting lights towards a normal direction or a small nearby range thereof.

Figure 8:
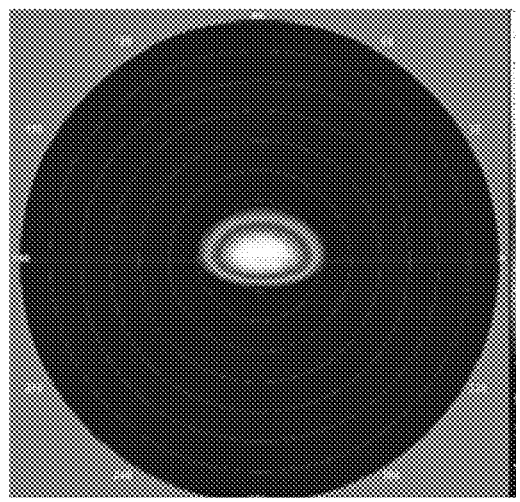
FIG. 8 is a light field distribution diagram of an embodiment of the present invention.
Figure 9A:
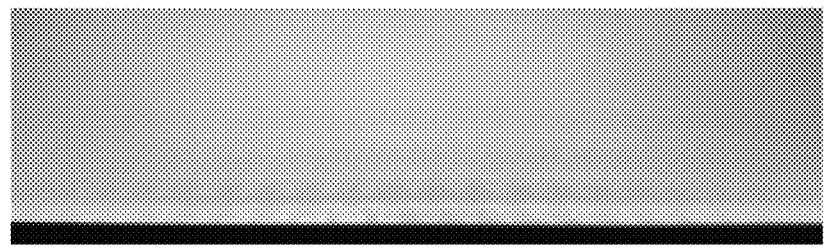
FIG. 9A is a schematic image diagram of a light entry side of an architecture of a conventional backlight module.
Figure 9B:
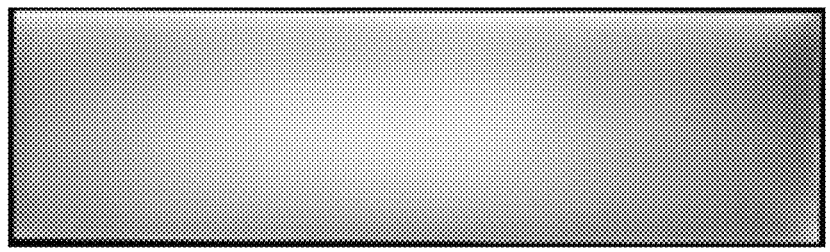
FIG. 9B is a schematic image diagram of a light entry side of a backlight module according to an embodiment of the present invention.

FIG. 8 is a light field distribution diagram of a backlight module according to the present invention. As shown in FIG. 8, the light is concentrated in the center and its nearby area, indicating that the exiting lights are guided towards a normal direction and a nearby range thereof in this embodiment of the present invention. Therefore, the effects of viewing angle convergence and anti-peeping can be achieved. In addition, when the backlight module 10 in the embodiments of the present invention is used in automotive displays, industrial control, and other display fields to replace the thick light guide plates currently employed in these display fields, improvements in terms of reduced projected water ripple phenomenon can be observed, as shown by FIG. 9A (prior art) and 9B (present invention embodiment).

Figure 10:
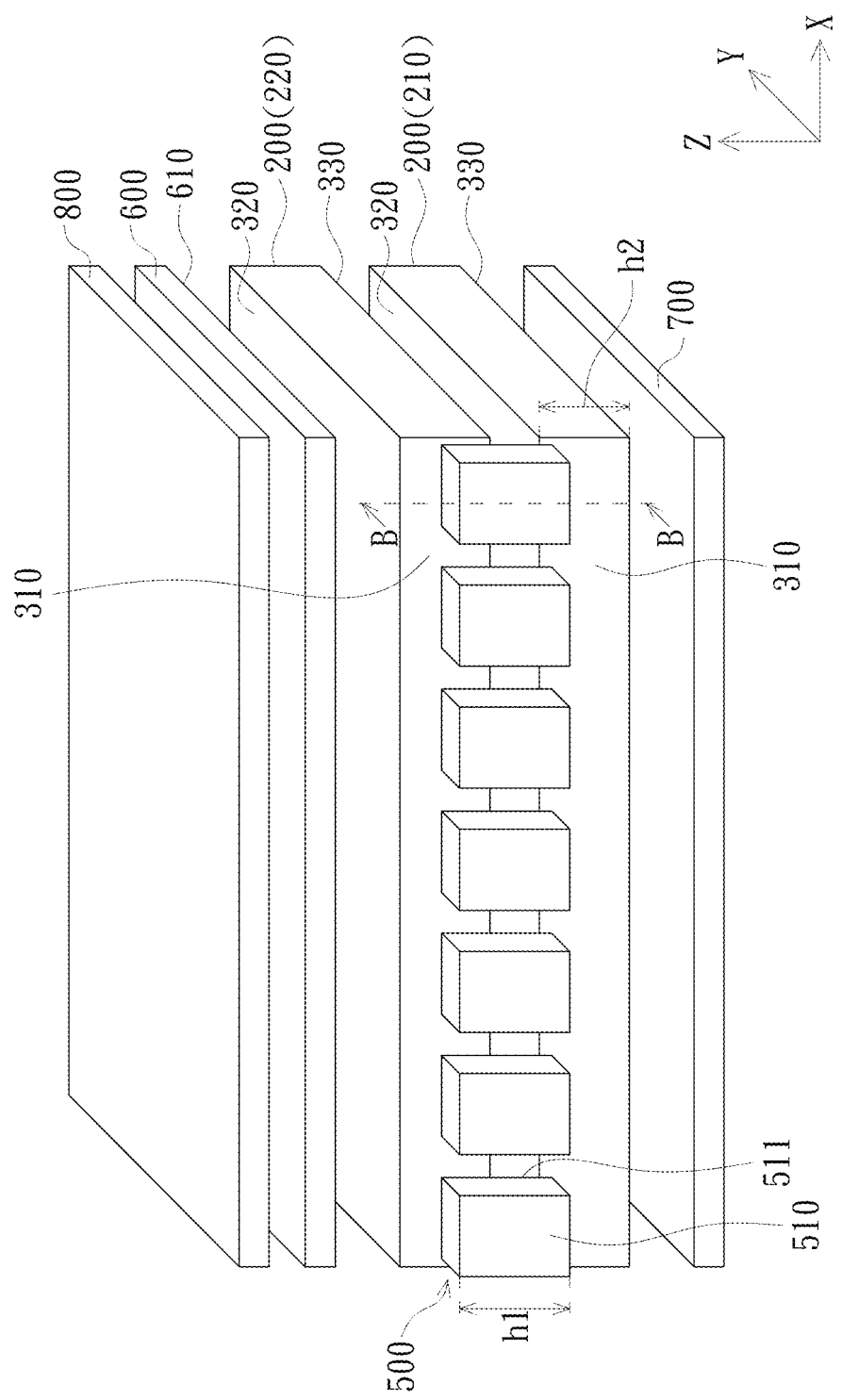
FIG. 10 is a schematic three-dimensional diagram of a backlight module according to another embodiment of the present invention.
Figure 11:
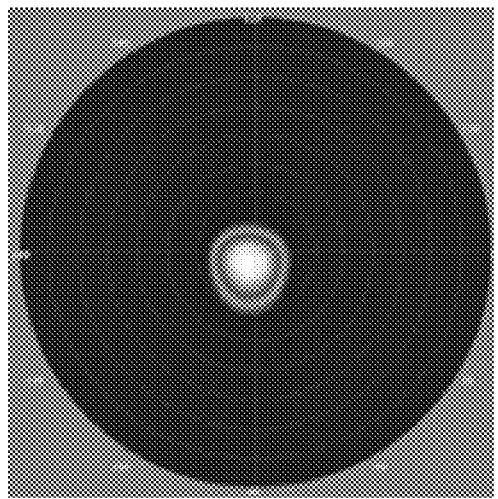
FIG. 11 is a light field distribution diagram of another embodiment of the present invention.

As shown in FIG. 1, the backlight module 10 in the embodiments of the present invention may further include a reflecting sheet 700 configured to reflect lights exiting from the bottom surface 330, so as to increase light utilization. In addition, as shown in FIG. 10, the backlight module 10 of this embodiment of the present invention may further include an anti-peeping sheet 800. The anti-peeping sheet 800 can reduce the energy of lights exiting at a large viewing angle, thereby further enhancing the anti-peeping effect. FIG. 11 is a light field distribution diagram according to the embodiment shown in FIG. 10. Those skilled in the art of the present invention can determine whether to use the anti-peeping sheet 800 based on specific brightness requirements and anti-peeping needs.

The backlight module 10 in the embodiments of the present invention is highly directional and can allow a smaller angle range for lights to exit, and therefore ensures high light utilization, and is capable of achieving the effects of viewing angle convergence and anti-peeping while maintaining brightness. Although the anti-peeping sheet is used to improve the ant-peeping effect, the brightness can still be maintained at a certain level.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight module, comprising:
a plurality of light guide plates, wherein the plurality of light guide plates are stacked, each of the light guide plates comprises a light-incident surface, a light exit surface, a bottom surface, and a light guide structure; wherein:
the light exit surface and the bottom surface are located on two opposite sides of the light guide plate and both connected to the light-incident surface;
the light guide structure is formed on the bottom surface, and comprises a plurality of prisms; the plurality of prisms are arranged along a direction away from the light entry side, wherein each of the prisms has a first surface and a second surface, and the first surface and the second surface border each other along an edge line of the prism; and
the light-incident surfaces of the plurality of light guide plates are placed on a light entry side and arranged along a stacking direction;
a light source module, disposed on the light entry side and comprising a plurality of light-emitting elements, wherein the plurality of light-emitting elements are arranged in a single line along the light-incident surface of the plurality of light guide plates, and each of the light-emitting elements has a light emitting surface facing the light-incident surfaces of the plurality of light guide plates; and a deflecting film, disposed on the plurality of light guide plates.

2. The backlight module according to claim 1, wherein the light guide structure further comprises a plurality of microstructure groups, and each of the microstructure groups comprises a plurality of microstructures and is arranged between two adjacent prisms.

3. The backlight module according to claim 1, wherein the first surface has a first angle with respect to the bottom surface, the second surface has a second angle with respect to the bottom surface, and the first angle is not equal to the second angle.

4. The backlight module according to claim 3, wherein the first angle is greater than the second angle, and wherein the second angle is smaller than 15 degrees.

5. The backlight module according to claim 4, wherein the first surface faces the light entry side, the second surface faces away from the light entry side, and the second angle is smaller than 3 degrees.

6. The backlight module according to claim 1, wherein the plurality of light-emitting elements are suitable for emitting light to the plurality of light guide plates through the plurality of light-incident surfaces, the plurality of light guide plates are suitable for light to exit at a light exit angle, and the light exit angle is greater than 70 degrees.

7. The backlight module according to claim 1, wherein a height of the light-incident surface of the light guide plate is smaller than a height of the light emitting surface of the light-emitting element along the stacking direction.

8. The backlight module according to claim 7, wherein the plurality of light guide plates further comprise a first light guide plate and a second light guide plate, the second light guide plate is disposed on a light exit surface side of the first light guide plate, and the height of the plurality of light guide plates on the light-incident surface side is parallel to the stacking direction and is greater than or equal to the height of the light emitting surface.

9. The backlight module according to claim 8, wherein the deflecting film further has a prism surface, and the prism surface of the deflecting film faces the light exit surface of the second light guide plate.

* * * * *